(12) United States Patent
Cammann

(10) Patent No.: US 8,164,020 B2
(45) Date of Patent: Apr. 24, 2012

(54) ELECTRODE AND ITS USE IN A METAL DISINTEGRATOR

(75) Inventor: Henry R. Cammann, Birmingham, OH (US)

(73) Assignee: Cammann, Inc., Birmingham, OH (US)

(*) Notice: Subject to any disclaimer, the term of this patent is extended or adjusted under 35 U.S.C. 154(b) by 406 days.

(21) Appl. No.: 12/499,217

(22) Filed: Jul. 8, 2009

(65) Prior Publication Data
US 2011/0006042 A1 Jan. 13, 2011

(51) Int. Cl.
*B23K 9/013* (2006.01)
(52) U.S. Cl. ............... 219/69.1; 219/69.2; 219/70
(58) Field of Classification Search ............ 219/69.1, 219/70, 69.14, 69.15, 69.17, 69.2
See application file for complete search history.

(56) References Cited

U.S. PATENT DOCUMENTS

| | | | | |
|---|---|---|---|---|
| 4,259,562 A | * | 3/1981 | Cammann et al. | 219/69.2 |
| 4,584,452 A | * | 4/1986 | Zafred | 219/69.2 |
| 4,665,293 A | * | 5/1987 | Crespin | 219/69.2 |
| 4,672,162 A | * | 6/1987 | Burns et al. | 219/69.1 |
| 5,262,608 A | * | 11/1993 | Mustonen | 219/69.1 |
| 2008/0142488 A1 | | 6/2008 | Luo et al. | |

FOREIGN PATENT DOCUMENTS

| | | |
|---|---|---|
| CN | 1141008 C | 6/2002 |
| EP | 0464264 A | 1/1992 |
| JP | 8-118150 A * | 5/1996 |
| JP | 2002-346836 A * | 12/2002 |
| SU | 1491636 A | 7/1989 |

OTHER PUBLICATIONS

Machine translation of Japan Patent No. 8-118,150, Oct. 2011.*
Machine translation of Japan Patent No. 2002-346,836, Oct. 2011.*
British Search Report dated Sep. 21, 2010 received in corresponding Application No. GB1011304.1, filed Jul. 5, 2010.

* cited by examiner

*Primary Examiner* — Geoffrey S Evans
(74) *Attorney, Agent, or Firm* — Pearne & Gordon LLP

(57) ABSTRACT

A graphite electrode and a holder for the electrode for use in a metal disintegrator, the electrode having a hollow columnar body with a skirt wall open at one end, the skirt wall having a plurality of holes extending between one end and an opposite end, the holes being adapted to conduct liquid coolant from said opposite end to said open end, the holder being proportioned to engage and support the electrode at its opposite end when the electrode is installed on a metal disintegrator, the electrode and holder being constructed and arranged to vent a portion of the volume of said liquid coolant through a space between a part being disintegrated and an interior surface of the skirt wall.

9 Claims, 2 Drawing Sheets

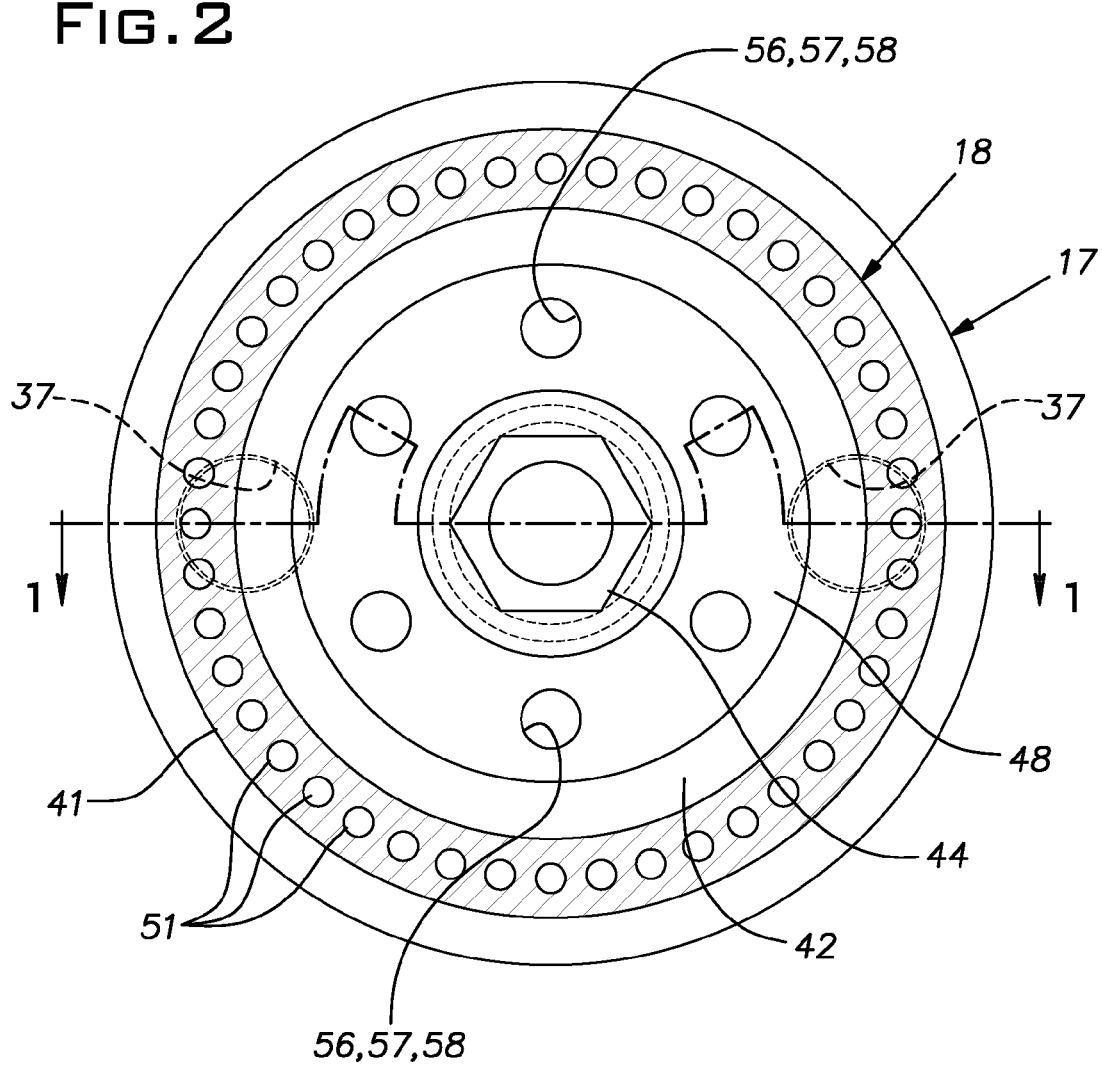

ELECTRODE AND ITS USE IN A METAL DISINTEGRATOR

The invention relates to improvements in metal disintegrating machines and processes.

BACKGROUND OF THE INVENTION

Metal disintegrators have been used for decades to cut metal components that, typically, are too hard, inaccessible or otherwise impractical for more conventional cutting techniques such as drilling, milling, sawing, abrading or oxygen acetylene torching. Metal disintegrators vibrate a graphite electrode into and out of contact with a metal part to be cut. Electrical current supplied at the cutting end of the electrode turns local areas of the part being cut molten and water or other liquid coolant solidifies and fractures the local molten areas into small free particles when the electrode cyclically pulls away from the part. The process cycles many times a second, e.g. 60 or 50 Hz until a cut is completed to the desired depth.

When parts of large cross-section are to be severed from a surrounding body such as a stud locked in a hole, it is known to use a tubular electrode having an outside diameter slightly smaller than the stud. The electrode is used to burn through the operative length of the stud leaving a disembodied core. This technique greatly reduces the total energy required for burning the stud free of its surrounding solid compared to what would be required if a solid or coreless electrode was used. In practice, tubular electrodes of the prior art experience limitations in the size or included cross-section and length or depth of a cut. Beyond certain electrode included cross-section size and length combinations, cutting action is slowed or eventually stopped and accuracy is compromised or lost.

SUMMARY OF THE INVENTION

The invention advances the art of contact arc thermal shock metal cutting machines, commonly known as metal disintegrators, by providing hollow electrodes with a coolant vent path for the interior of the electrode. It has been discovered that continuous coolant flushing action of the interior of the hollow electrode through its holder end greatly improves cutting performance. The vent path permits the interior of the electrode to be continuously flushed with liquid coolant to carry away metal particles that would otherwise re-arc at random sites so as to accelerate wear of the electrode and lose precision of the cut. Moreover, venting, in accordance with the invention, avoids excessive back pressure of the liquid coolant that otherwise interferes and eventually stops necessary vibration of the electrode induced by the head of the machine into and out of contact with the part being disintegrated.

BRIEF DESCRIPTION OF THE DRAWINGS

FIG. 2 is an axial view of the electrode holder and electrode taken in the plane 2-2 indicated in FIG. 1.

DESCRIPTION OF THE PREFERRED EMBODIMENT

Figure 1:
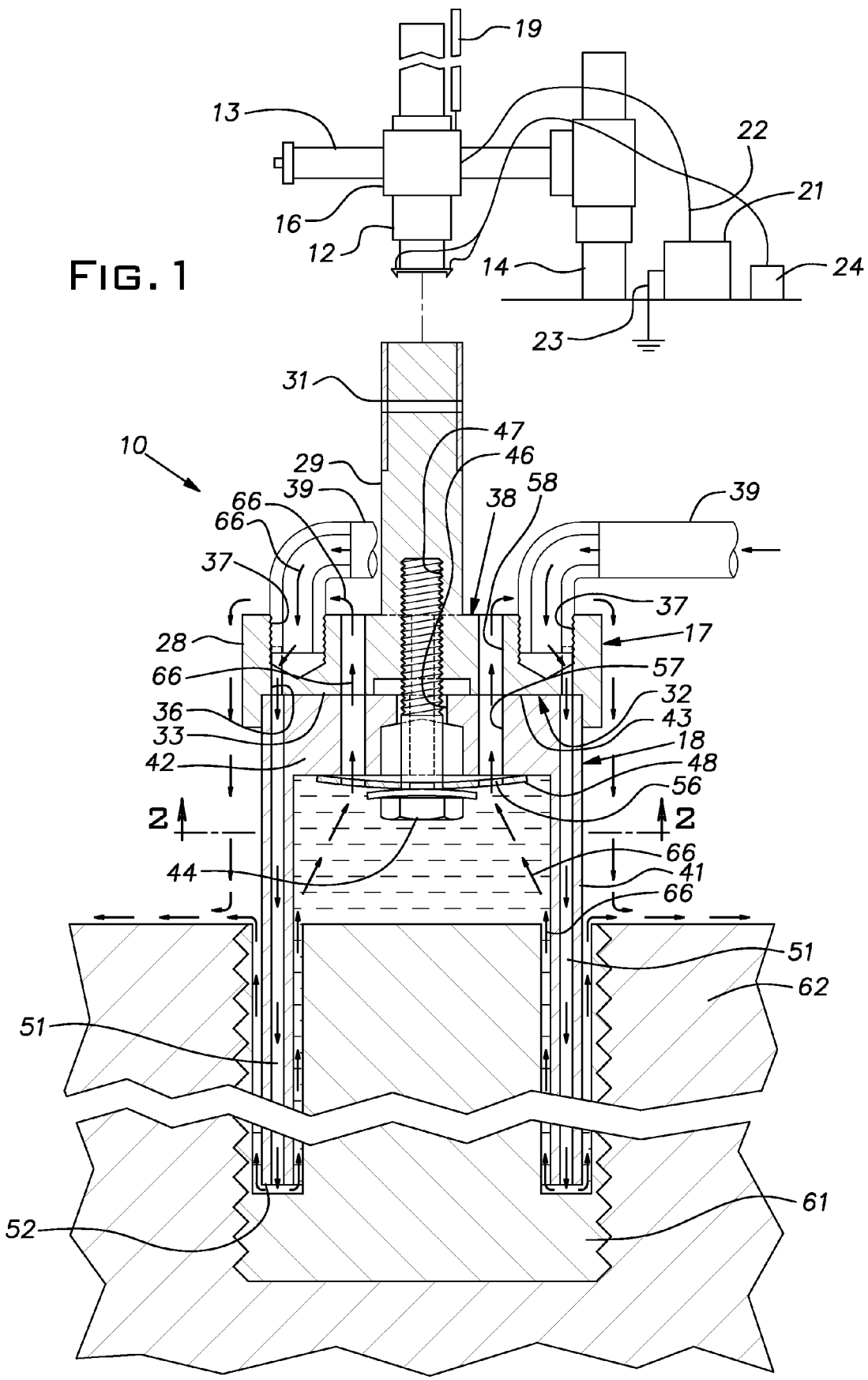
FIG. 1 is a somewhat diagrammatic illustration of a metal disintegrator machine including a vertical cross-section of an electrode holder and electrode taken in the offset planes indicated at 1-1 in FIG. 2.

Referring now to the drawing, a metal disintegrator machine 10 includes a head 12 carried and horizontally adjustable on an arm 13. The arm 13, in turn, is vertically adjustable on a vertical post 14. The mounting of the head 12 on the arm and the mounting of the arm on the post 14 provide angular adjustments about horizontal and vertical axii. Those skilled in the art will recognize that the head 12 can be supported in other orientations beyond that shown and can be mounted on special hardware or bracketry to suit a particular job. The head 12 is vertically slidable on a vertical guide 16 and the majority of the weight of the head, including a vibration inducing solenoid contained in the head, an electrode holder 17, and an electrode 18 is largely counterbalanced with an air cylinder 19 aligned vertically with the guide 16 and supplied from a regulated source of air pressure above atmospheric pressure.

A power supply 21 delivers alternating current at relatively low voltage, e.g. 32 volts, and relatively high current, e.g. 300+ amps to the head 12 through a cable 22 to the head and a cable 23 serving to ground a body in which the part to be disintegrated is located. A source 24 of coolant, commonly water, can be a pump or connected to a utility line with suitable pressure controls.

The illustrated electrode holder 17 comprises a circular generally flat plate 28 with an integral central upstanding stud 29 on its upper side. The holder is preferably made of aluminum so that it is highly electrically conductive. The stud 29 is received in a socket on an armature of the vibration solenoid located in the head 12 as is known in the art. The stud 29 can be fitted with a bronze sleeve 31 to be gripped in the socket. The power supply, through the cable 22 is connected to the solenoid socket to conduct electrical power to the holder 17.

A lower face 32 of the holder 17 is machined or otherwise formed with a circular pocket 33 to receive a mounting end 34 of the electrode 18. An annular groove 36 is formed adjacent the periphery of the pocket 33 and communicates with two ports 37 through an upper face 38 of the holder plate connected to the source 24 of coolant through supply lines 39.

In its illustrated form, the electrode 18 is a hollow, circular unitary body that includes a cylindrical thin wall tube 41 and an end wall 42 that represents part of the mounting end 34 of the electrode. The outside diameter of the electrode 18 fits within the pocket 33 on the lower face of the holder plate 28 so that the outer face of the end wall 42 abuts a base surface 43 of the pocket 33. A bolt 44 assembled through a central hole 46 in the end wall 42 is threaded into a central blind hole 47 in the holder 17. The bolt 44 compresses a spring washer 48 to retain the electrode end wall 42 in the pocket 33 of the holder 17.

A plurality of preferably uniformly angularly spaced coolant passages 51 are drilled or otherwise formed through the electrode tubular wall 41 from a lower cutting end 52 of the tube wall to the outer face of the end wall 42, i.e. the mounting end 34 of the electrode. The passages or holes 51 at the holder end lie under and communicate directly with the annular groove or channel 36 enabling the channel to serve as a manifold for the holes. A set of angularly spaced aligned holes 56, 57 and 58 are provided in the spring washer 48, electrode end wall 42 and holder plate 28, respectively.

In operation, coolant, such as plain water, from the source 24 is directed through the supply lines 39 to the ports 37 and into the annular groove or channel 36. The channel 36 distributes the coolant to the coolant passages 51 in the electrode tube wall 41. The solenoid in the head 12 vibrates the electrode holder 17 and electrode 18 to alternately contact and draw away from a workpiece 61. FIG. 1 illustrates the electrode 18 after it has partially burned into the workpiece 61 shown as a threaded metal bolt received in a threaded hole in a large body 62. Either the body 62, if it is electrically conductive, or the workpiece 61, is grounded relative to the power supply 11. The solenoid vibrates at the frequency of the current applied to it, i.e. 60 or 50 Hz for example. The electrode 18 is typically sized so that its outside diameter is slightly smaller than the root diameter of the threads of the bolt or workpiece 61.

When the cutting end 52 contacts a workpiece 61 it turns local areas of the workpiece molten from the resistance heating that results from the application of the large electrical current. When the cutting end 52 moves away from the workpiece 61, an electrical arc is extinguished and coolant discharges through the holes 51 to suddenly chill the molten metal causing it to shatter into small solidified particles. In this manner, the electrode 18 burns a path through the workpiece 61 slightly larger than the cross section of the electrode itself. That is, the major diameter and the minor diameter of a groove being cut into the workpiece 61 are respectively larger and smaller than the corresponding outer and inner surfaces of the electrode 18. The clearance created between the wall surfaces of the electrode 18 and the wall surfaces burned into the workpiece 61 affords annular channels for the coolant to escape and carry with it the metal particles being created in a flushing action.

The size and number of the coolant passages or holes 51 will depend on the size of the electrode 18. The aligned holes 56, 57 and 58 in the spring washer 48, electrode end wall 42 and holder plate 28 have the unique function of venting the interior of the electrode 18, permitting flow of coolant along the path generally indicated by the arrows 66. Venting of the interior of the electrode afforded by the vent holes 56, 57 and 58 at the holder end 34 of the electrode has been found to produce dramatic increases in the performance of a disintegrator.

It has been discovered that by venting the interior of the electrode 18 back through the end 34 of the electrode being held, electrodes of much greater diameter and/or length beyond what has heretofore been used are not only practical but work remarkably well in terms of speed and quality of cut. Still further, it is has been found that results are improved when the total vent or open area afforded by the holes 58, 56, and 57 in the washer 48, end wall 42 and holder plate 28 are related to the total cross sectional area of the coolant passages or holes 51. Depending on the size and configuration of the electrode, this relationship can range between about 50% to about 150%. In most instances, it is desirable to adjust or restrict the vent open area for the interior of the hollow electrode 18 so that more than half of the coolant flow flushes the exterior wall of the electrode.

The coolant passages 51 can have a diameter of about 3/32" to about 1/8". Holes or bores of this size will leave no core or minimal core as the electrode 18 cuts through a workpiece. Where a core might be left by coolant passages, either because they are of a larger size or because of other conditions, these cores can be eliminated by simply rotating the electrode a few degrees about its longitudinal axis.

It will be understood that the hollow columnar electrode can take other cross-sectional shapes such as that of a square, rectangle, or hexagon. Still further, it is contemplated that the electrode can be formed without an end wall at its end opposite the cutting end. In such a case, a holder or its equivalent can be used to throttle and thereby limit coolant flow back through the interior of the electrode.

The electrode 18 will cut material within about 1/32" of its interior and exterior wall surfaces. With the present invention, a much improved uniformity of the cut and life of the electrode have been experienced because of the flushing action on the exterior and interior of the electrode and the consequent avoidance of re-arcing of the particles which can otherwise be trapped between the exterior and interior walls of the electrode and the adjacent walls of the workpiece being cut.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method of disintegration of a metal body using a tubular columnar wall graphite electrode with an interior and an exterior and a cutting end to cut a closed boundary channel in the metal body, comprising vibrating the electrode in a direction parallel to the columnar wall of the electrode while applying a voltage to make and break an arc between the cutting end and body to cause areas of the body at the arc to become molten, supplying coolant through the electrode wall from an opposite end remote from the cutting end to thermally shock and fracture molten surface areas of the body heated by current supplied by the electrode contacting said surface areas into solidified particles, the electrode contacting the body at its forward position of a vibration cycle and delivering coolant to the body when the electrode is at a rearward position of the vibrating cycle, and allowing coolant to flush the solidified particles along both the exterior and interior of the electrode.

2. A method as set forth in claim 1, wherein a path for coolant carrying solidified particles from the cutting end of the electrode through the interior of the electrode is restricted to limit its volume to less than the volume of coolant carrying solidified particles from the cutting end over the exterior of the electrode.

3. A method as set forth in claim 2, wherein the volume of coolant carrying solidified particles from the cutting end through the interior of the electrode is limited by the size of an open area in a wall closing the opposite end of the electrode.

4. A graphite electrode for a metal disintegrator comprising a hollow columnar body, the body having a skirt wall open at one end and at least partially open at an end opposite said one end, the skirt wall having a plurality of holes extending between said one end and said opposite end adapted to conduct liquid coolant from said opposite end to said open end, the opposite end having a vent area arranged to vent a portion of the volume of coolant passing through said skirt wall holes.

5. A graphite electrode as set forth in claim 4, wherein the vent area is in a range of about 50 to 150% of the collective cross-sectional area of the skirt wall holes.

6. In combination, a graphite electrode and a holder for the electrode for use in a metal disintegrator, the electrode having a hollow columnar body with a skirt wall open at one end, the skirt wall having a plurality of holes extending between one end and an opposite end, the holes being adapted to conduct liquid coolant from said opposite end to said open end, the holder being proportioned to engage and support the electrode at its opposite end when the electrode is installed on a metal disintegrator, the electrode and holder being constructed and arranged to vent a portion of the volume of said liquid coolant through a space between a part being disintegrated and an interior surface of the skirt wall.

7. The combination as set forth in claim 6, wherein the holder is arranged to conduct electrical disintegration current with the electrode.

8. The combination as set forth in claim 7, wherein one or both the holder and electrode have vent areas that limit a volume of coolant passing through said space.

9. The combination as set forth in claim 8, wherein a cross-section of the limited area of the holder and/or electrode is about 50 to 150% of the collective cross-sectional area of the holes in the skirt.

* * * * *